Aug. 25, 1925.
J. E. PIETERICK
1,551,116
AUTOMOBILE ATTACHMENT
Filed Jan. 12, 1925
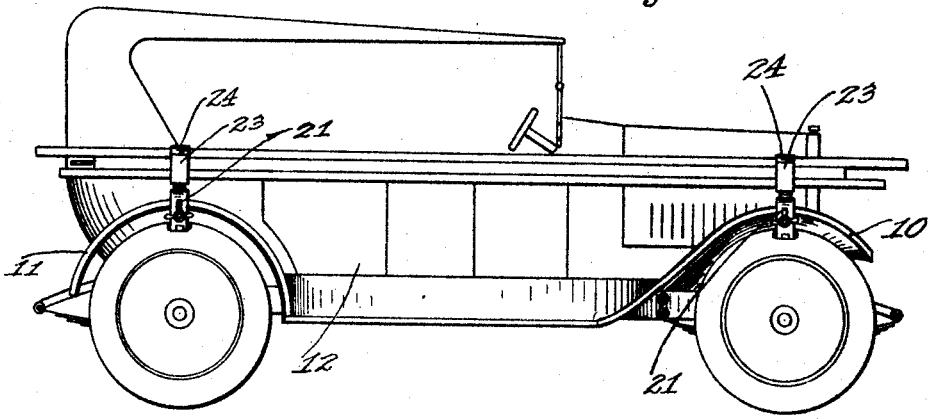
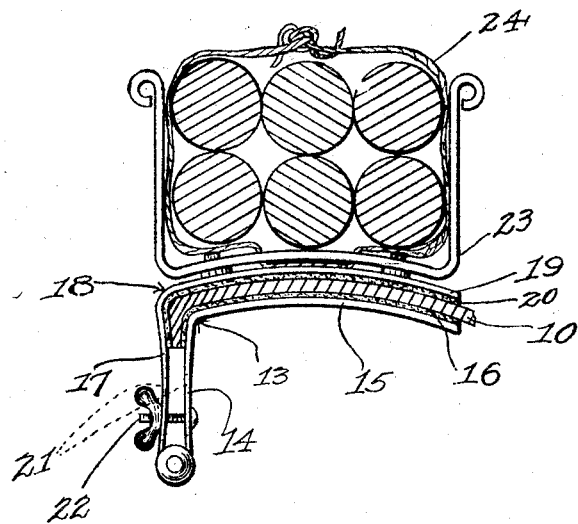
Inventor
John E. Pieterick.

Patented Aug. 25, 1925.

1,551,116

UNITED STATES PATENT OFFICE.

JOHN E. PIETERICK, OF CAYUGA, NORTH DAKOTA.

AUTOMOBILE ATTACHMENT.

Application filed January 12, 1925. Serial No. 2,043.

*To all whom it may concern:*

Be it known that I, JOHN E. PIETERICK, a citizen of the United States, residing at Cayuga, in the county of Sargent, State of North Dakota, have invented certain new and useful Improvements in Automobile Attachments; and I do hereby declare the following to be a full, clear, and exact description of the invention, such as will enable others skilled in the art to which it appertains to make and use the same.

This invention relates to new and useful improvements in carrying devices, and particularly to devices for carrying tent poles, fishing poles, and other long objects, on the side of an automobile.

One object of the invention is to provide a device which may be easily and quickly attached to an automobile, whereby to support long objects.

Another object is to provide a device of this character which is applicable to the front and rear fenders, or mudguards of an automobile, and which is provided with means for securing the long objects, such as tent poles, and the like, thereon.

Other objects and advantages will be apparent from the following description when taken in connection with the accompanying drawing.

In the drawing:

Figure 1 is a side elevation of a portion of an automobile, showing the invention thereon.

Figure 2 is an enlarged vertical sectional view through one of the fenders or mudguards, showing the invention in elevation, and the poles in section.

Referring particularly to the accompanying drawing, 10 represents the front fender or mudguard, and 11 the rear fender or mudguard, of the automobile 12, in connection with which the present invention is adapted for use.

As seen in Figure 2, the device includes the substantially L-shaped member 13, the vertical leg 14, of which is disposed at the outer side of the fender of the automobile, and pendant with relation thereto. The horizontal leg 15, of the member 13, is curved longitudinally, and lies against the lower concave face of the fender, transversely thereof, and at the highest point of the longitudinal curvature of the fender. The upper face of the horizontal leg 15 is provided with a strip of felt 16, which prevents injury to the fender, and also prevents rattling. Hinged to the lower end of the vertical leg 14 is the lower end of the vertical leg 17, of a second L-shaped member 18, the horizontal leg 19, of which, is longitudinally curved, in conformity to the leg 15, and lies on the upper face of the fender, with a strip of felt 20, between it and the upper enameled face of the fender. Each of the vertical legs is longitudinally slotted, as shown at 21, and through these slots is disposed a clamping bolt 22, whereby the legs will be drawn tightly together, and clamp the horizontal legs against the upper and lower faces of the fender.

Secured to the upper face of the horizontal leg 19 is an angular U-shaped member 23, the legs of which extend vertically from the leg 19, and in alinement transversely of the fender whereby to provide a space between said legs for the corresponding ends of a number of tent poles, or the like. The horizontal portion of the U-shaped member 23 is formed with openings through which is passed a strap, or heavy cord 24, which is arranged to be drawn around the ends of the poles, and tied, whereby to hold the poles from rattling, and from dislodgment from the member 23.

As clearly seen in Figure 1, there is one of the members secured to a front fender, and another member secured to the rear fender of the same side of the automobile, whereby to support the forward and rearward ends of poles.

By loosening the clamping bolt 22 the members 13 and 23 will move away from each other, by reason of the hinged connection between the legs of said members, and thereby cause the horizontal legs of the members to become detached from the fender. This readily permits the application or removal of the device.

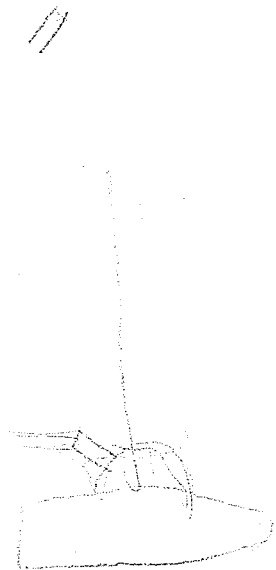

What is claimed is:

1. An article carrying attachment for the fender of an automobile comprising a pair of L-shaped members movably connected together the corresponding legs of said members being arranged for engagement with the upper and lower faces of a fender, means carried by the other legs of the members for clamping the members in such engagement, and a U-shaped member carried by one of the L-shaped members.

2. An article carrying attachment for the fender of an automobile comprising a pair of angle members each having an arcuate leg and a straight leg, the straight legs being pivotally connected together, clamping means engaged through the pivotally connected legs, the arcuate legs being adapted for engagement respectively with the upper and lower faces of a fender, an article supporting means on one of the said arcuate legs, and a flexible binding means on said article supporting means.

In testimony whereof, I affix my signature.

JOHN E. PIETERICK.